United States Patent
Peters et al.

(10) Patent No.: US 7,987,213 B2
(45) Date of Patent: Jul. 26, 2011

(54) STORAGE PROFILE GENERATION FOR NETWORK-CONNECTED PORTABLE STORAGE DEVICES

(75) Inventors: Marc Andre Peters, Eindhoven (NL); Wilhelmus Henrica Gerarda Maria Van Den Boomen, Eindhoven (NL); Godefridus Antonius Maria Crienen, Baarlo (NL); Esko Olavi Dijk, Eindhoven (NL); Freddy Snijder, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 613 days.

(21) Appl. No.: 12/067,957

(22) PCT Filed: Sep. 21, 2006

(86) PCT No.: PCT/IB2006/053417
§ 371 (c)(1),
(2), (4) Date: Mar. 25, 2008

(87) PCT Pub. No.: WO2007/034430
PCT Pub. Date: Mar. 29, 2007

(65) Prior Publication Data
US 2008/0256144 A1    Oct. 16, 2008

(30) Foreign Application Priority Data
Sep. 26, 2005    (EP) ................................. 05108849

(51) Int. Cl.
*G06F 7/00*    (2006.01)

(52) U.S. Cl. ...................................................... 707/812
(58) Field of Classification Search ............ 707/999.01, 707/964, 966, 661, 665, 812
See application file for complete search history.

(56) References Cited

U.S. PATENT DOCUMENTS

| | | | |
|---|---|---|---|
| 6,003,020 A | 12/1999 | Hazelhurst et al. | |
| 6,801,992 B2 * | 10/2004 | Gajjar et al. | ............... 711/173 |
| 7,152,018 B2 * | 12/2006 | Wicks | ....................... 702/186 |
| 2005/0086187 A1 | 4/2005 | Grosser et al. | |
| 2005/0108297 A1 * | 5/2005 | Rollin et al. | .................. 707/201 |

FOREIGN PATENT DOCUMENTS

| | | |
|---|---|---|
| WO | 2004025411 A2 | 3/2004 |
| WO | 2006033068 A1 | 3/2006 |

OTHER PUBLICATIONS

Renny Shen, 2008, Create a smarter storage strategy.*

* cited by examiner

*Primary Examiner* — Angela M Lie

(57) ABSTRACT

A data storage system comprises a plurality of portable data storage devices (12) coupled via a network (10). Each of the portable data storage devices (12) has an associated storage profile, which defines a which data objects will be stored in the storage device. A recommended profile for at least one of the portable data storage devices us automatically generated, using the steps of—collecting profile information about storage profiles for portable data storage devices (12) other than the at least one of the portable data storage devices (12) and/or data object information about properties of data objects stored by the portable data storage devices (12) other than the at least one of the portable data storage devices (12), —using the profile information and/or data information to guide generation of the recommended storage profile.

17 Claims, 3 Drawing Sheets

STORAGE PROFILE GENERATION FOR NETWORK-CONNECTED PORTABLE STORAGE DEVICES

The invention relates to network-based portable storage devices, to a system containing such storage devices and to a method of operating such a system.

European patent application ("Organizing content" filed by the same applicant, filing number 04104564) discloses a system that comprises intelligent portable storage devices coupled to a network. A user interface is provided for an organized retrieval of coherent sets of data objects in appropriate physical objects (the storage devices).

Unintelligent storage devices such as CD-ROMs, videotapes, magnetic disks, memory cards or sticks have long been known as a means for supplying data to a playback equipment. When a person wants a playback of some data, i.e. to render images, sounds etc. represented by the data, the person picks up a portable storage device that contains the desired data and couples this device to replay equipment. On a visit to friends, for example, a person may take along a CD-ROM/DVD with photographs/video for showing them with a DVD player, or the person may attach the device to a personal audio player etc.

The known devices are "unintelligent" in the sense that the user has to select what is stored on which device. The user has to ensure that data objects that he or she wants to render together (e.g. photographs on the same subject) are not stored distributed over many different devices, or that devices do not contain so much mutually different data objects that an impractical time is needed to sift through the content of the storage devices to locate relevant objects prior to rendering.

The European patent application describes a system wherein this problem is addressed by automatically downloading selected data objects to different data storage devices. For each portable storage device a storage profile is defined to control selection of the data objects. The profile of a storage device acts as a definition of a filter for data objects that should be stored on the storage device. The profile may be specified for example as a set of attribute-value (or attribute-value_range) pairs, such as type-"photograph", subject-"holiday", date-"March-June" (herein type, subject, date are examples of attribute names, and photograph, holiday, March-June are examples of values and value ranges).

The storage devices are coupled to a network (e.g. a wireless network). Preferably, the storage devices comprise respective data processors. When a data object becomes available on the network, the processors test the properties of the data object against the storage profiles of the storage devices, to determine whether or not to store the data object in a specific storage device. Similarly, the storage profiles may be used to determine whether or not to copy data objects from one storage device to another. Preferably each storage device is provided with a simple display that indicates a type of the stored storage profile.

In this way the user can retrieve data objects of a certain type by physically selecting the storage device for that type of storage object. No computer literacy is needed. When the user wants to render data objects with a certain storage profile he or she only needs to pick up a data storage device that has the desired storage profile (decoupling it from the network if necessary) and couple it to a rendering device, such as an audio player, an image display device etc that has an interface for receiving data from the storage device.

Expansion of the system is a matter of adding portable storage devices. It is envisioned that relatively simple and low-cost storage devices are used, so that a user can easily expand the system by adding a portable storage device, for example when data objects with new properties become available (e.g. photographs of a recent holiday), or when use of the system with the existing storage devices has become difficult.

One problem with the system of the European patent application is the need to define a storage profile for each portable storage device. This has to be done by a user. Each time when a new portable storage device is added the profile has to be defined. This significantly complicates use of the system and makes it error-prone.

Among others it is an object of the invention to provide for a system of portable storage devices with storage profiles wherein the storage profiles can more easily be established.

Among others it is an object of the invention to provide for a system of portable storage devices with storage profiles wherein differentiated storage profiles can more easily be established.

Among others it is an object of the invention to provide for a portable storage device for use in a system of portable storage devices with storage profiles, wherein the storage profile of the storage device can more easily be established.

A data storage system according to the invention is set forth in claim 1. The system comprises

- a communication network;
- a plurality of portable data storage devices (and optionally also fixed storage devices) for coupling to the network (10);
- a device (12, 14a-c) for storing profile-based storage control arrangement, configured for defining a respective storage profile for each respective one of the portable data storage devices (12), each respective one of the portable data storage devices (12) being configured to store data objects that are selected according to its respective storage profile;
- a recommender arrangement (12, 14a-c) for coupling to the network (10) and generating a recommended storage profile for at least one of the portable data storage devices (12), the recommender arrangement (12, 14a-c) being arranged to collect profile information about storage profiles for further at least one of the portable data storage devices (12) other than the at least one of the portable data storage devices (12) and/or data object information about properties of data objects stored by the further at least one of the portable data storage devices (12), and to use the profile information and/or the data object information to guide generation of the recommended storage profile.

The storage profile may define how data objects should be selected for storage in the storage device. The recommender arrangement may be a part of an interface unit for coupling to the storage device via the network, or it may be part of the portable storage device or its functions may be performed by different devices that are coupled to each other via the network. Thus coordinated storage tasks can be assigned to at least one of the portable storage devices.

The recommended storage profile may be generated by refining an existing storage profile of one or more of the further portable data storage devices. Thus, for example, the storage device may be dedicated to storage of data objects on a more specific topics or range of topics. A storage profile may be refined by adding a requirement that applies only to a significant sub-part of the data objects stored in one or more of the portable data storage devices other than the at least one of the portable data storage devices. The need for those further storage device to store data objects on other storage devices can be relieved in this way.

The recommended storage profile may also be generated by broadening a storage profile of one or more of the further portable data storage devices. Thus the storage device can be used to collect data object on a broader range of topics, so that there is no longer a need to connect a plurality of storage devices to access data objects on this range of topics. A storage profile may be broadened refine the existing storage profile by broadening or removing a requirement that excludes data objects stored in the further data storage device.

In an embodiment coordinated profile recommendations for updating storage profiles of a plurality of the portable data storage devices together, for example in response to connection of a new storage device to the system. Thus, for example the storage profiles may be adjusted to distribute data objects more evenly, or to specialize storage devices on selected topics, by narrowing down an existing storage profile of a storage device, while creating a new storage profile for the subject matter that is removed by the narrowing down.

In an embodiment a profile recommendation is generated using a user-provided positive or negative example for the suggested profile, or of the data objects that should be covered by the profile. Thus, the user does not need to have the skill to edit storage profiles. Instead the user can give examples by indicating a storage device or a data object, which is intuitively more understandable for most users.

In an embodiment a new profile recommendation is generated in response to detection of storage underflow, impending overflow or overflow of storage in the respective one of the portable data storage devices. Thus, an automatic management of storage devices is realized.

In one embodiment the system is arranged to apply the recommendation automatically when it is generated without user intervention, but preferably the recommendation, or an example of its effect (e.g. examples of data objects that will be stored according to the storage profile) is first shown to the user and applied only after an approval signal from the user.

The portable data storage device is provided for connection to the system comprising a plurality of further portable data storage devices (12) for connecting in a network (10), the portable data storage device comprising a recommender arrangement (12, 14a-c) for generating a recommended profile for the portable data storage device (12), the recommender arrangement (12, 14a-c) being arranged to collect profile information about storage profiles for at least one further portable data storage device (12) and/or data object information about properties of data objects stored by the at least one further portable data storage device (12), and to use the profile information and/or data object information to guide generation of the recommended storage profile.

The recommender arrangement may be realized with a data processing device (12, 14a-c) adapted for coupling to at least one of a plurality of portable data storage devices (12) for connecting to a network (10), each respective one of the portable data storage devices being configured to store data objects that are selected according to its respective storage profile, and for generating a recommended storage profile for at least one of the portable data storage devices, the device being further adapted to collect profile information about storage profiles for further at least one of the portable data storage devices (12) other than the at least one of the portable data storage devices (12) and/or data object information about properties of data objects stored by the further at least one of the portable data storage devices (12), and to use the profile information and/or the data object information to guide generation of the recommended storage profile.

According to the invention, a method is provided for operating the data storage system that comprises a plurality of portable data storage devices (12) coupled via a network (10), each of the portable data storage devices (12) having a respective storage profile which defines selection of data objects for storage on the portable storage device (12), the method comprising generating a recommended storage profile for at least one of the portable data storage devices, using the steps of collecting profile information about storage profiles for further at least one of the portable data storage devices (12) other than the at least one of the portable data storage devices (12) and/or data object information about properties of data objects stored by the further at least one of the portable data storage devices (12), and using the profile information and/or the data object information to guide generation of the recommended storage profile.

These and other objects and advantages of the invention will become apparent from a description of exemplary embodiments using the following figures.

Figure 1:
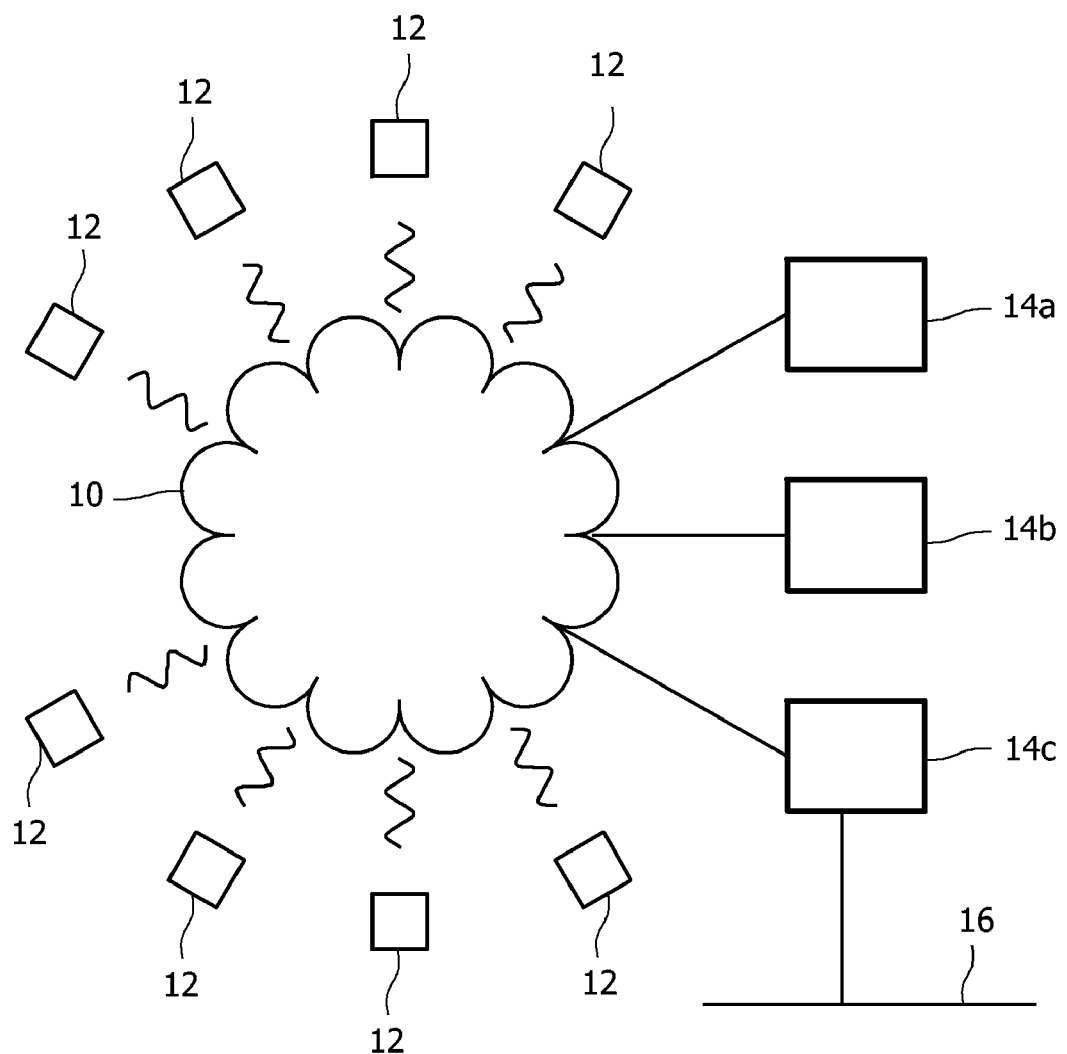
FIG. 1 shows an embodiment of a system of storage devices.

FIG. 1 shows an embodiment of a system of storage devices 12. The system contains a network 10, a plurality of portable storage devices 12 and interface devices 14*a-c*. Portable storage devices 12 and interface devices 14*a-c* are configured for coupling to the network 10. By way of example a first one of interface devices 14*a-c* is shown coupled to a link 16 to the Internet. The storage devices may contain semiconductor memory or an embedded magnetic disk drive etc. to store data objects. In one embodiment one or more storage devices may also contain a capture device, such as e.g. a camera or an audio capture circuit.

Storage profiles are available for programmable storage devices 12. Each storage profile defines a class of data objects that should be stored on the corresponding storage device 12. Data objects can be electronic photographs and/or video programs and/or mp3 sound files, document files and/or any other objects. In one embodiment each storage device 12 stores data that defines its storage profile. In another embodiment storage profiles for at least some of the storage devices are stored at an interface device 14*a-c*. Although storage profiles are defined for all storage devices 12 that are shown in the figure, it should be understood that this does not exclude that other storage devices (not shown) are present for which no storage profile is available.

In one embodiment a storage profile is specified as a set of attribute value (-range) pairs. In this embodiment a plurality of attributes is defined for data objects (for example "type", "genre", "recording date", "subject", "actors", "recording location", "length" etc.). For each data object values are defined for the attributes (e.g. type=photograph, recording date=1-1-2000, genre=holiday_photo, recording location=Munich etc.); some attributes may be left unspecified. In this embodiment a storage profile contains definitions of (ranges of) values for different attributes. Thus, one storage profile might be directed at holiday photographs in the year 2000 for example, whereas another storage profile might be directed at audio files with guitar music for example.

It should be realized that although for some types of attribute a unique value may be defined for each specific data objects (e.g. storage date), but that other attributes may have no value for some objects (e.g. the attribute "color/black and white" is not defined for audio data objects) and other attributes may have multiple values for each object (e.g. for attributes like "keyword", or "content similar to").

In operation, data objects are made available to interface devices 14a-c. Data objects are made available for example by coupling a digital camera to one of the interface devices 14a-c, by coupling a memory card to the network, by receiving data objects from the Internet, from cable or wireless broadcasts etc. When a data object is made available, it is matched against the storage profiles for the different storage devices 12. When the data object matches one of the storage profiles the data object is stored in the storage device 12 with the matching storage profile. In the embodiment with attribute-value pairs, for example, matching is performed by comparing attribute values that are supplied with the data object with values (or value ranges) specified in the storage profile. In other embodiments the data (e.g. image data or sound data) in the data objects is processed to derive a characteristic measurement that is compared with a value (-range) in the storage profile.

In one embodiment, matching is performed in portable storage devices 12. In this embodiment the interface device 14a-c that makes a data object available first transmits its attribute values, which are received and compared with the storage profiles in the programmable storage devices 12. In this embodiment each storage device 12 contains a data processor circuit (not shown) to perform the required matching. A storage device 12 that detects a match of the attribute values with its storage profile initiates a download of the data object in response. In another embodiment matching with the storage profiles is performed by a data processor circuit in an interface device 14a-c, which triggers downloading to a storage device 12 in response to a match.

In an embodiment it is allowed that storage profiles "overlap", which means that the same data object may match the storage profiles of more than one storage device 12. In one embodiment data objects that meet more than one profile are stored in each of the corresponding storage devices 12. In another embodiment the system makes a selection of one of these storage devices 12 for such data objects so that the data object is stored in the selected storage device only. The selection may be implemented by means of a (central) data processing device in the system that handles download requests, or by some form of network mediated negotiation process performed by data processors of the different storage devices 12. Selection may be performed on the basis of most available storage space, or on a round robin basis etc. for example, or by selecting the storage device 12 with the most recently defined storage profile.

Figure 2:
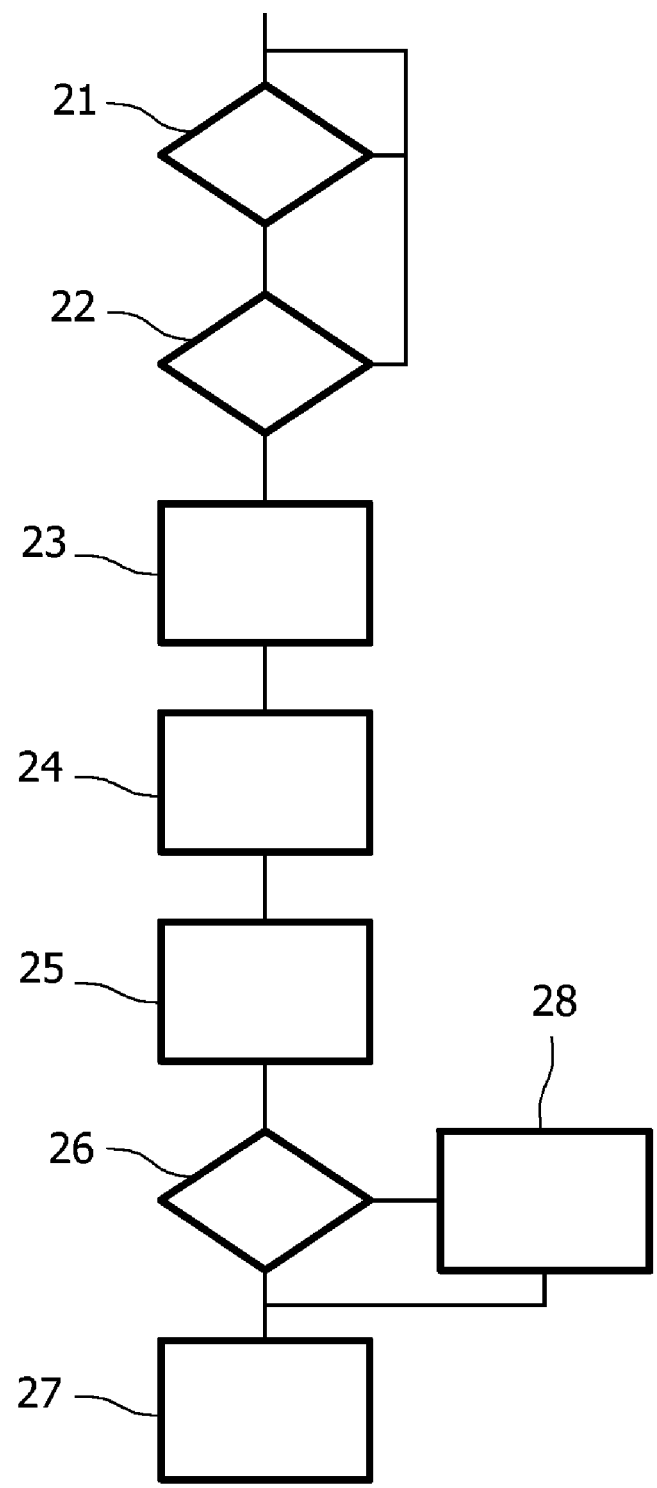
FIG. 2 shows a flow-chart for making a recommendation.

FIG. 2 shows a flow chart of operation of the system when a new storage device 12 is added to the system. In one embodiment the steps are performed under control of one of the interface devices 14a-c or by the data processing device, e.g. by executing a computer program that implements the flow-chart. Alternatively the interface device 14a-c may have a hardwired circuit to perform the steps. In another embodiment, at least part of the steps may be performed by the newly added storage device 12 itself.

In a first step 21 coupling of a storage device 12 to network 10 is detected. In a second step 22 it is detected whether a storage profile has been previously defined for this storage device in the system. If so the process returns to first step 21.

If no storage profile has been defined previously a third step 23 is executed, to gather information about data objects stored in existing storage devices 12 that are coupled to the network and optionally about storage profiles of the existing storage devices 12 and other system properties of existing storage devices 12. Optionally, also the user is prompted, for example a message displayed on the new storage device or by one of the interface devices 14a-c, and user information is input from which properties of a desired type of profile can be inferred.

Subsequently, a fourth step 24 is executed wherein a new storage profile is derived from the information gathered in third step 23. In a fifth step 25, a representation of the new storage profile is displayed to the user, preferably on a display screen of the new storage device 12, but alternatively on a display screen of one of the interface devices 14a-c. In a sixth step 26, a user acceptance/rejection of the new storage profile is detected. If the new storage profile is accepted, the new storage profile is assigned to the new storage device 12 in a seventh step 27. If the new storage profile is not accepted, an eight step 28 is executed to manually amend the new storage profile, or to define a new storage profile, after which seventh step 27 is executed.

Alternatively, in sixth step 26 additional information may be input from the user to indicate desired amendments to a suggested profile, after which the process may be repeated from fourth step, using the additional information.

Various alternative methods can be used for deriving the new storage profile in fourth step 24, with corresponding alternatives for the information that is gathered in third step 23. The main invention is not limited to any specific type of method. The selection of the methods depends on underlying strategy choices. In general, strategies can be distinguished into concentration strategies and distribution strategies.

When a concentration strategy is used, profiles are selected that gather types of data object that were previously stored more distributed over different storage devices 12. Typically, a concentration strategy aims to reduce the number of storage devices 12 that a user needs to collect when he or she wants to retrieve a certain type of information. Embodiments of fourth step 24 that implement a concentration strategy may involve the identification of attribute values that occur most frequently in the storage profiles for existing storage devices, or the identification of attribute values of data objects that have been retrieved most frequently for example, and use of the identified attributes values as required values for the new storage profile.

When a distribution strategy is used, profiles are selected to distribute data objects of types that where previously stored on only one or a few storage devices 12. Typically, a distribution strategy aims to reduce the amount of data objects that is stored on a single storage device, so as to avoid overload. Embodiments of fourth step 24 that implement a distribution strategy may involve the identification of profiles that are met by the largest number of stored data objects and addition of requirements on the values of an additional attribute that can be used to split these data objects in groups of significant size. Similarly, the most frequently occurring identical or similar profiles may be identified and additional attribute values may be added that can be used to realize refined profiles. The identified attributes values may then be used as required values for the new storage profile.

Furthermore, methods are possible that implement combined concentration-distribution strategies. Typically, such a combination strategy aims to reduce the amount of data objects that is stored on a single storage device, but also to distribute coherent groups of data object over different storage devices. Embodiments of fourth step 24 that implement a concentration-distribution strategy may involve the same steps as a method for a pure concentration strategy, followed by clustering steps to identify refined profiles that split the data objects that fall under a proposed concentration profile into groups of significant size.

It should be appreciated that fourth step 24 need not be limited to a single method of selecting profiles, or to methods that implement a single type of strategy. A plurality of methods may be used in fourth step 24, each for suggesting one or more profiles. Also, a selection between different methods or strategies may be made dependent on the existing distribution of data objects over different storage devices 12, profile types for the existing storage devices 12 or preferences indicated by a user.

It should be emphasized that the invention is not limited to any specific method or combination of method of selecting profiles. A few examples of methods for selecting profiles will be given.

Figure 3:
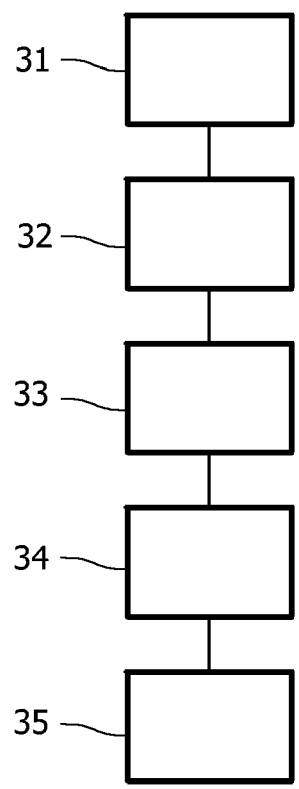
FIGS. 3-4 show examples of methods of constructing a new profile.

FIG. 3 shows a flow-chart of a first example of a method that implements a concentration strategy. In a first step 31 profiles of different existing storage devices 12 are gathered. In a second step 32, the attributes for which these profiles specify values (or ranges of values) are identified. In a third step 33, statistical information about the frequency of the attribute values is gathered. In a fourth step 34 attribute-value combinations are selected for on the basis of the statistical data. In a fifth step 35 a suggested profile is made that specifies the values of the attribute value combinations that have been identified in fourth step 34.

The statistical data may concern for example statistics (counts) of profiles that use the value, statistics of previously stored data objects that have the value and/or of retrieval actions that used data objects that have the value. In a simple example, the statistical data is gathered by counting for each possible value of the attributes how many profiles include the value. In this case values that occur in profiles at more than a threshold frequency may be included in the new profile for example. Alternatively, gathering of statistical data may include counting the number of stored data objects with an attribute value at one or more or at all storage devices. In this case values that occur in stored data objects at more than a threshold frequency may be included in the new profile for example.

Figure 4:
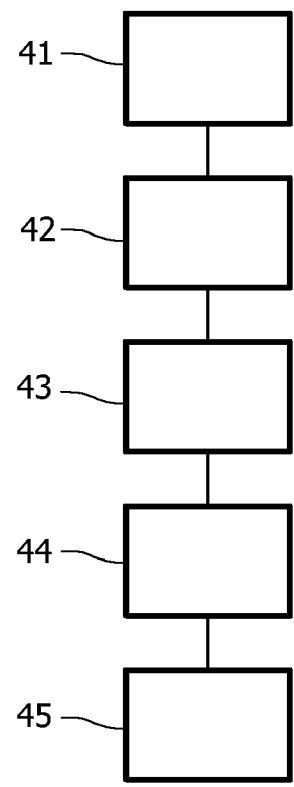

FIG. 4 shows an example of a method that implements a distribution strategy. In a first step 41 an existing profile is selected for refinement. In a second step 42 attributes are identified for which the profile does not define values (or the profile defines a range of values). In a third step 43 statistics are gathered for the attributes. In a fourth step 44 the statistics are used to select values for one or more attributes that did not occur in the selected profile, or refinements of the range of values of an existing attribute or attributes of the selected profile. In a fifth step 45 a new suggested profile is formed that is the same as the selected profile with an additional requirement on the value of the selected attribute or attributes. A profile may be selected for example by identifying a storage device that is most nearly overloaded, or that has been receiving data objects at the rate that will lead to overload in the nearest future.

The statistical data may concern for example statistics (counts) of profiles that use the value, statistics of previously stored data objects that have the value and/or of retrieval actions that used data objects that have the value. In a simple example, gathering statistics involves counting how many times attribute values occur in data objects that apply the selected profile. In this case, for example, values may be selected that obtain for a significant fraction of the data objects. As an alternative, data about the number of times that the data objects have been retrieved may be used as a weight to determine a weighted fraction. A fraction of significant size is for example a fraction that contains between one tenth and one half of the data objects on the relevant storage device 12.

However, it should be appreciated that one tenth and one half are examples. Smaller or larger values may be used to define significant size, e.g. a fraction of 0.05 for the lower limit and 0.6 or 0.25 for the higher limit.

It should again be emphasized that the illustrated methods merely serve as simple examples of profile generation. In practice more complicated methods may be used. For example, in the case of the concentration method, when an attribute can have values from an ordered range of values (e.g. an attribute like "creation date") a range may be selected instead of individual values (e.g. a smallest range that covers more than a selected fraction of the total count from third step 33 for values of the relevant attribute). As another example any value limitation on values of an attribute may be removed if there are no values that have a pronouncedly higher count than the other values (e.g. if the entropy of the distribution over different values is above a threshold value). The thresholds may be adapted for example so that the number of previously stored data objects that meets the proposed profile remains below a further threshold.

In place of simple attributes, combined attributes may also be used in these methods (i.e. combined attributes that specify a combination of values, or value ranges, for different attributes, or boolean combinations of conditions on attributes, such as AND, OR, Exclusive OR etc.). Similarly, in places where the methods refer to a storage device 12 a combination of storage devices may be used by the methods.

In another exemplary embodiment of a method that implements a concentration strategy, a count of use of data objects is used. In this case, an attribute "number of times read" may be defined for each data object and storage space may be provided in storage devices 12 (or elsewhere in the system) for storing information that represents the values of this attribute for respective data objects. Each storage device 12 may be arranged to update this information about a data object when this data object is read. Subsequently, when a new storage device is added, a suggested profile is constructed by performing a first step that identifies the data objects for which this attribute exceeds a threshold value. Next attributes are identified for which these selected data objects that have pronouncedly unequal distribution of values (e.g. an entropy below a threshold, or one or more values that occur with more than twice the average frequency). These attributes are included in the suggested profile, which specifies that these attribute must have the values that occur most frequently for the selected data objects.

A concentration method may be combined with a distribution method. For example, once a suggested profile has been compiled by a method for a concentration strategy a method for a distribution strategy may be used to add constraints on the values of attributes of this profile. This may be done for example by replacing the search for fractions of significant size stored on the most loaded storage device 12 of a distribution method by a search for different sub-groups of significant size of the data objects (i.e. forming a significant fraction of stored data objects) anywhere in the system that meet the suggested profile from the concentration method.

As another example, session data may be used, which identifies respective sessions and data objects that have been retrieved in the respective sessions. The start and end of a session may be defined for example explicitly by a user, or implicitly by the activation of one or more storage devices by a user. During the session it is recorded which data objects are retrieved. This may be done by storage devices 12 themselves for example. The session retrieval data may be used to define profiles. In one embodiment the session retrieval data is used in a concentration strategy to define a profile that would have collected data objects that have been retrieved in a same session. This embodiment may use a method for a concentration strategy wherein the suggested profile requires a set of attribute values that is shared by all data objects in a selected session. Various versions of such a method may be used. One extreme type of method selects values for as many attributes as possible that are shared by data objects of a session. Another extreme type of method selects values for as few attributes as consistent with limiting the number of stored data objects in the system that meet the profile to below a predetermined maximum. Another type of method selects values for as few attributes as sufficient to exclude all data objects retrieved in one or more other sessions.

Although the methods of selecting suggested profiles discussed so far do not involve user intervention before the suggested profile has been constructed, it should be appreciated that other methods may involve such intervention during or before construction of the suggested profile. The system may require the user to indicate a number of data objects of the type that he or she wants to store in a newly connected storage device 12, and/or the user may be required to indicate one or more storage devices that store the same type of data object that should be stored in the newly added storage device 12. In addition the user may be required to indicate data objects of a type that should not be stored or storage devices that store data objects of a type that should not be stored. Subsequently the system may apply any method to generate profiles that satisfy the selections made by the user, for example by identifying common attribute values for the data objects, or attribute values that distinguish these data objects from undesired data objects or shared attribute values of the data objects that occur with less than average frequency among other stored objects. A similar technique could be applied to the attributes of the profile of an indicated storage device 12 or to the data objects in such a storage device 12.

The display to the user in fifth step 25 may be performed by showing the attributes and the values that are required by the proposed profile. Alternatively a graphical/textual summary may be generated by an algorithm, whose input is the profile attributes/values and whose output is the summary. E.g. one summary could use a "globe" icon to represent the "location" attribute and draw the value next to it. E.g. another algorithm could represent the attribute/value pair "person"="Esko" with a retrieved photo of the face of Esko. Alternatively, or in addition, a list of previously stored data objects may be shown that meet the profile, and/or a list of data objects that do not meet the profile. For this purpose, the system (e.g. a data processing circuit in a storage device or an interface device 14a-c) may be designed to collect and identify such data objects, using the suggested profile. In one embodiment the lists may be limited, for example to data objects that have been stored and/or used more recently than a predetermined date. The user may use the display to judge whether the profile is acceptable. In one embodiment, the system may be designed to offer the user the opportunity to indicate what is wrong with a suggested profile, for example by indicating data objects in the list or lists that should not or should be stored in the new storage device 12. In this case the method of FIG. 2 may return to fourth step 24 to select a more refined or a broadened profile.

In another embodiment selection of a new profile may start by showing a list of data objects stored in a selected object (or more generally data objects that meet a selected profile), i.e. by starting from fifth step 25 with an existing profile. In this case the user may be prompted to indicate a refinement or broadening that should be applied to an existing profile to obtain a new profile, by indicating data objects that fall under the existing profile and should or should not fall under the new profile, or by indicating data objects that do not fall under the existing profile and should or should not fall under the new profile. Subsequently, the system may select additional requirements on attribute values to refine the existing profile, or requirements on attribute values in the existing profile that can be removed to broaden the existing profile.

In another embodiment, the user may be required to indicate a plurality of storage objects of which the profiles should be merged, to obtain a profile for data objects that satisfy each of the indicated profiles, or to join the profiles, to obtain a profile for data objects that satisfy any of the indicated profiles.

As described the system is capable of generating new profiles using information about profiles for existing storage devices 12 and/or information about data objects stored in existing storage devices 12 and/or using user information. As disclosed, the new profiles are shown to the user as recommendations, which may be accepted by the user and then applied henceforth to collect data objects in the new storage device.

Alternatively, however, this method may be used to update the profile of an existing storage device when the user is not satisfied with its existing storage profile, or when the system has detected a problem with an existing storage profile (e.g. an overflow or underflow of the associated storage device 12). Also, suggestions may be made to modify profiles for a number of storage devices together, for example to create complementary storage profiles that provide different refinements of a common overarching storage profile.

Furthermore, in another embodiment, the step of receiving user acceptance for the storage profile may be skipped, the suggested storage profile being applied automatically, or its acceptance being delayed to a later date after the storage profile has been tested for some time.

The invention claimed is:

1. A data storage system, comprising:
a communication network;
a plurality of portable data storage devices coupled to the network;
a device for storing a profile-based storage control arrangement, wherein the control arrangement performs matching of received data objects with storage profiles for different portable data storage devices of the plurality of portable data storage devices by accessing a respective storage profile that defines respective classes of data objects that should be stored for each respective one of the portable data storage devices, further wherein each respective one of the portable data storage devices stores data objects that are matched according to its respective storage profile; and
a recommender arrangement coupled to the network for automatically generating a recommended storage profile for at least one of the portable data storage devices, wherein the recommender arrangement (i) collects profile information about storage profiles for further at least one of the portable data storage devices other than the at least one of the portable data storage devices and/or data object information about properties of data objects stored by the further at least one of the portable data storage devices other than the at least one of the portable data storage devices, and (ii) uses the collected profile information and/or the data object information to guide the automatic generation of the recommended storage profile for the at least one of the portable data storage devices.

2. The data storage system according to claim 1, wherein the recommender arrangement automatically generates the recommended storage profile in response to detection of a first connection of the at least one of the portable data storage devices to the network.

3. The data storage system according to claim 1, wherein the recommender arrangement automatically generates the recommended storage profile by refining an existing storage profile of the further at least one of the portable data storage devices.

4. The data storage system according to claim 1, wherein the recommender arrangement automatically generates the recommended storage profile by broadening an existing storage profile of the further at least one of the portable data storage devices.

5. The data storage system according to claim 4, wherein the recommender arrangement broadens the existing storage profile by broadening or removing a requirement that excludes data objects stored in the further at least one of the portable data storage devices.

6. The data storage system according to claim 1, wherein the recommender arrangement automatically generates the profile recommendation by identifying a requirement defined in a storage profile for the further at least one of the portable data storage devices and/or met by data objects stored in the further at least one of the portable data storage devices, and adding the identified requirement to the generated profile recommendation.

7. The data storage system according to claim 1, wherein the recommender arrangement automatically generates the profile recommendation by identifying requirements met by a plurality of data objects stored in the further at least one of the portable data storage devices, and including the identified requirement to the generated profile recommendation.

8. The data storage system according to claim 1, wherein the recommender arrangement automatically generates coordinated profile recommendations for updating storage profiles of the plurality of the portable data storage devices.

9. The data storage system according to claim 1, wherein the recommender arrangement automatically generates the profile recommendation using a user indication of a profile or a user indication of one or more data objects, or a user indication of a portable data storage device to indicate the profile of the portable data storage device or a user indication of data objects stored in any portable data storage device, as a positive or negative example for the suggested profile, or of the data objects that should be covered by the profile.

10. The data storage system according to claim 1, comprising an interface device for automatically generating the recommended storage profile for portable data storage devices that are coupled to the interface device via the network.

11. A data storage system, comprising:
a communication network;
a plurality of portable data storage devices for coupling to the network;
a device for storing profile-based storage control arrangement, configured for defining a respective storage profile for each respective one of the portable data storage devices, each respective one of the portable data storage devices being configured to store data objects that are selected according to its respective storage profile; and
a recommender arrangement for coupling to the network and generating a recommended storage profile for at least one of the portable data storage devices, the recommender arrangement being arranged to collect profile information about storage profiles for further at least one of the portable data storage devices other than the at least one of the portable data storage devices and/or data object information about properties of data objects stored by the further at least one of the portable data storage devices, and to use the profile information and/or the data object information to guide generation of the recommended storage profile, wherein the recommender arrangement is arranged to generate the recommended storage profile by refining an existing storage profile of the further at least one of the portable data storage devices, wherein the recommender arrangement is arranged to refine the existing storage profile by adding a requirement that applies only to a significant subpart of the data objects stored in the further at least one of the portable data storage devices.

12. A data storage system, comprising:
a communication network;
a plurality of portable data storage devices for coupling to the network;
a device for storing profile-based storage control arrangement, configured for defining a respective storage profile for each respective one of the portable data storage devices, each respective one of the portable data storage devices being configured to store data objects that are selected according to its respective storage profile; and
a recommender arrangement for coupling to the network and generating a recommended storage profile for at least one of the portable data storage devices, the recommender arrangement being arranged to collect profile information about storage profiles for further at least one of the portable data storage devices other than the at least one of the portable data storage devices and/or data object information about properties of data objects stored by the further at least one of the portable data storage devices, and to use the profile information and/or the data object information to guide generation of the recommended storage profile, wherein a plurality of recommender arrangements are provided, each included in a respective one of the portable data storage devices and arranged to recommend a storage profile for its respective one of the portable data storage devices in response to connection of the respective one of the portable data storage devices to the system and/or detection of storage underflow, impending overflow or overflow of storage in the respective one of the portable data storage devices.

13. A portable data storage device for connection to a system including a plurality of further portable data storage devices coupled in a network, the portable data storage device comprising:
a recommender arrangement for automatically generating a recommended storage profile for the portable data storage device, wherein the recommender arrangement (i) collects profile information about storage profiles for at least one further portable data storage device and/or data object information about properties of data objects stored by the at least one further portable data storage device, wherein a respective storage profile defines respective classes of data objects that should be stored for each respective one of the further portable data storage devices, and (ii) uses the collected profile information and/or data object information to guide the automatic generation of the recommended storage profile for the portable data storage device.

14. A data processing device comprising:
means for coupling to at least one of a plurality of portable data storage devices connected to a network, each respective one of the portable data storage devices being configured to store data objects that are selected according to its respective storage profile, and for automatically generating a recommended storage profile for at least one of the portable data storage devices; and means for collecting profile information about storage profiles for further at least one of the portable data storage devices other than the at least one of the portable data storage devices and/or data object information about properties of data objects stored by the further at least one of the portable data storage devices, wherein a respective storage profile defines respective classes of data objects that should be stored for each respective one of the further at least one of the portable data storage devices, and for using the profile information and/or the data object information to guide the automatic generation of the recommended storage profile for the at least one of the portable data storage devices.

15. A method of operating a data storage system that includes a plurality of portable data storage devices coupled via a network, each of the portable data storage devices having a respective storage profile which defines selection of data objects for storage on the portable storage device, the method comprising:

automatically generating, via processor, a recommended storage profile for at least one of the portable data storage devices, using the steps of:

collecting, via the processor, profile information about storage profiles for further at least one of the portable data storage devices other than the at least one of the portable data storage devices and/or data object information about properties of data objects stored by the further at least one of the portable data storage devices, and using, via the processor, the collected profile information and/or the data object information to guide the automatic generation of the recommended storage profile for the at least one of the portable data storage devices wherein a respective storage profile defines respective classes of data objects that should be stored for each respective one of the further at least one of the portable data storage devices.

16. The method according to claim 15, further comprising:

detecting, via the processor, a first connection of the at least one of the portable data storage devices to the network; and generating, via the processor, the automatically generated recommended storage profile for the at least one of the portable data storage devices in response to said detection of the first connection.

17. A computer program product comprising instructions which, when executed by a programmable computer cause the computer to perform the steps of claim 15 to automatically generate the recommended storage profile for the at least one of the portable data storage devices.

\* \* \* \* \*